(12) United States Patent  (10) Patent No.: US 7,726,742 B2
Keyser et al.  (45) Date of Patent: Jun. 1, 2010

(54) VEHICLE SEAT HAVING A RECLINER MECHANISM

(75) Inventors: Mark R. Keyser, Lake Orion, MI (US); H. Winston Maue, Farmington Hills, MI (US); John F. Nathan, Highland Township, MI (US); Karl Kennedy, Fraser, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/211,166

(22) Filed: Sep. 16, 2008

(65) Prior Publication Data

US 2009/0079248 A1  Mar. 26, 2009

(51) Int. Cl.
*B60N 2/22* (2006.01)
*B60N 2/235* (2006.01)

(52) U.S. Cl. .................................. 297/362; 297/362.11
(58) Field of Classification Search ................. 297/362, 297/362.11
See application file for complete search history.

(56) References Cited

U.S. PATENT DOCUMENTS

| 4,195,881 | A | * | 4/1980 | Kluting et al. .......... 297/362 X |
| 5,350,216 | A | * | 9/1994 | Ito .............................. 297/362 |
| 6,371,557 | B1 | * | 4/2002 | Holloway ............... 297/362 X |
| 6,712,430 | B2 | * | 3/2004 | Ito et al. ..................... 297/362 |
| 7,066,543 | B2 | * | 6/2006 | Yu ........................... 297/362 X |
| 7,294,081 | B2 | * | 11/2007 | Schuler et al. .............. 475/149 |
| 7,322,257 | B2 | * | 1/2008 | Becker et al. ................ 74/409 |
| 7,328,939 | B2 | * | 2/2008 | Moriyama et al. .. 297/362.11 X |
| 7,329,200 | B2 | * | 2/2008 | Schuler et al. ...... 297/362.11 X |
| 2004/0221670 | A1 | * | 11/2004 | Becker et al. .............. 74/411.5 |
| 2007/0029893 | A1 | * | 2/2007 | Schuler et al. ...... 297/362.11 X |

\* cited by examiner

*Primary Examiner*—Rodney B White
(74) *Attorney, Agent, or Firm*—Brooks Kushman P.C.

(57) ABSTRACT

A vehicle seat assembly includes a seat back that is pivotally connected to a seat bottom, a lock mechanism that is configured to inhibit the seat back from pivoting when locked and to permit the seat back to pivot when unlocked, and a release and drive mechanism. The release and drive mechanism includes a mounting member, a drive gear that is rotatable with respect to the mounting member and that is connected to the lock mechanism, and a motor that is connected to the drive gear. The drive gear is rotationally limited to a defined angular range. The motor rotates the drive gear through the defined angular range which moves the lock mechanism to an unlocked state and thereafter causes the seat back to pivot.

28 Claims, 9 Drawing Sheets

VEHICLE SEAT HAVING A RECLINER MECHANISM

CROSS-REFERENCE TO RELATED APPLICATIONS

This application claims the benefit of U.S. provisional application Ser. Nos. 60/994,688 filed Sep. 21, 2007, 60/987,515 filed Nov. 13, 2007 and 61/063,956 filed Feb. 7, 2008.

BACKGROUND OF THE INVENTION

1. Field of the Invention

Embodiments of the invention disclosed herein relate to the field of vehicle seat assemblies having a seat back that is pivotable with respect to the seat bottom and include a release and drive mechanism for unlocking the seat back to pivot with respect to the seat bottom and pivoting the seat back with respect to the seat bottom.

2. Background Art

Vehicle seat assemblies having a seat back that is pivotable with respects to an associated seat bottom are known. In some embodiments of such vehicle seat assemblies, it is possible to fold the seat back forward on top of the seat bottom to provide added room and/or additional floor surface for the storage of cargo.

Such vehicle seat assemblies typically include a locking mechanism which inhibit rotation of the seat back with respect to the seat bottom when locked and which permits rotation of the seat back with respect to the seat bottom when unlocked. In such vehicle seat assemblies, the locking mechanism must first be unlocked before the seat back may be folded forward over the seat bottom.

It is desirable to unlock the locking mechanism and control the pivot motion of the seat back using a single motor driven mechanism. Embodiments of the present invention address this and other problems.

SUMMARY OF THE INVENTION

Various embodiments of a vehicle seat assembly are disclosed herein. In a first embodiment, the vehicle seat assembly includes a seat body having a seat bottom and a seat back that is configured to pivot with respect to the seat bottom about a pivot axis. A lock mechanism is connected to the seat body. The lock mechanism is configured to inhibit the seat back from pivoting about the pivot axis when in a locked state and permits the seat back to pivot about the pivot axis when in an unlocked state. A release and drive mechanism is connected to the seat body for controlling pivotal movement of the seat back. The release and drive mechanism includes a mounting member attached to the seat body, a drive gear member rotatably connected to the mounting member and to the lock mechanism, and a motor that is connected to the seat body and to the drive gear member. The motor is configured to rotate the drive gear member. In this first embodiment, the mounting member and the drive gear member are configured to limit the rotation of the drive gear member to a defined angular range. Operation of the motor rotates the drive gear member through the defined angular range. Rotation of the drive gear member to a first end of the defined angular range moves the lock mechanism to the unlocked state. Further operation of the motor after the lock mechanism is in an unlocked state causes the seat back to pivot about the pivot axis through engagement between the motor and the drive gear member.

In an implementation of the first embodiment, the release and drive mechanism further includes a pinion gear member connected to the motor and disposed to engage the drive gear member. The pinion gear member transmitting torque from the motor to the drive gear member. In a variation of this implementation, a drive gear member and a pinion gear member each have teeth disposed along a respective periphery and wherein the teeth of the pinion gear member engage the teeth of the drive gear member. In another variation of this implementation, the release and drive mechanism further includes a motor shaft support member disposed at least partially about the pinion gear member.

In another implementation of the first embodiment, the mounting member is attached to the seat bottom and the motor is attached to the seat back. In a variation of this implementation, the release and drive mechanism further includes a pinion gear member attached to the seat back and connected to the motor. The pinion gear member is disposed to engage the drive gear member. The pinion gear member transmits torque from the motor to the drive gear member when the motor is actuated.

In another implementation of the first embodiment, the mounting member includes a stopping member. The drive gear member is configured to engage the stopping member. The drive gear member engages the stopping member at one end of the defined angular range. In a variation of this implementation, the drive gear member includes a slot defined in a surface of the drive gear member. The stopping member is disposed within the slot and moves along the slot as the drive gear member rotates through the defined angular range. In a further variation, the mounting member includes a plurality of the stopping members and the drive gear member includes a plurality of the slots. Each stopping member is disposed within a respective one of the slots and moves along the respective one of the slots as the drive gear member rotates through the defined angular range.

In another implementation of the first embodiment, the drive gear member is generally circular and includes a mounting opening extending through the approximate center of the drive gear member. The release and drive member further includes a first hub member extending through the mounting opening in the drive gear member and connected to the lock mechanism. The release and drive mechanism further includes a finger member connected to the drive gear member. The finger member projects radially inwardly into the mounting opening. The finger member is configured to engage the first hub member as the drive gear member rotates through the defined angular range. The hub member, in turn, moves the lock mechanism to the unlocked state. In a variation of this implementation, the first hub member is disposed substantially coaxially with the drive gear member.

In another variation of this implementation, the first hub member is generally cylindrical and includes a projecting member extending radially outwardly. The projecting member and the finger member cooperate to rotate the first hub member as the drive gear member rotates through the defined angular range. In a further variation, the release and drive mechanism includes a plurality of the fingers and the first hub member includes a plurality of the projecting members. Each finger member is configured to engage a respective one of the projecting members. Each finger member and projecting member cooperate to rotate the first hub member as the drive gear member moves through the defined angular range.

In another implementation of the first embodiment, the drive gear member is generally circular and includes a mounting opening that extends through the approximate center of the drive gear member. The release and drive mechanism further includes a first hub member extending through the mounting opening in the drive gear member and connected to the lock mechanism. The release and drive mechanism further includes a second hub member attached to the mounting member and disposed substantially coaxially with the pivot axis and the first hub. The drive gear member is mounted on the second hub and rotates about the second hub through the defined angular range through engagement between the mounting opening and the second hub.

In a variation of this implementation, the drive gear member is generally circular and includes a mounting opening extending through the approximate center of the drive gear member. The second hub extends through the mounting opening. The release and drive mechanism further comprises a finger member connected to the drive gear member. The finger member projects radially inwardly into the mounting opening. The finger member is configured to engage the first hub member as the drive member rotates through the defined angular range. The second hub member defines a finger opening. The finger member extends through the finger opening into the mounting opening to engage the first hub.

In a further variation of this implementation, the mounting member is attached to the seat bottom. The motor is attached to the seat back. The release and drive mechanism further includes a pinion gear member attached to the seat back and connected to the motor. The pinion gear member engages the drive gear member and transmits torque from the motor to the drive gear member. The mounting member includes a stopping member. The drive gear member defines a slot for receiving the stopping member. The first end of the defined angular range is defined by interference between the stopping member and an end of the slot as the drive gear member rotates. The first hub member is disposed substantially coaxially with the drive gear member.

In a second embodiment, the vehicle seat assembly includes a seat body having a seat bottom and a seat back that is configured to pivot with respect to the seat bottom about a pivot axis between a design position and a folded position. A lock mechanism is connected to the seat body. The lock mechanism is configured to inhibit the seat back from pivoting about the pivot axis when locked and permits the seat back to pivot about the pivot axis when unlocked. A release and drive mechanism for controlling pivotal movement of the seat back is connected to the seat body. The release and drive mechanism includes a mounting member that is attached to the seat body, a drive gear member that is substantially and moveably mounted to the mounting member, a release gear member that is disposed adjacent the drive gear member and rotatable therewith, the release gear member being connected to the lock mechanism, and a motor that is attached to the seat body and disposed to engage the release gear member when the seat back is in the design position. In this second embodiment, the release and drive mechanism is configured to limit rotation of the release gear member through a defined angular range. The motor engages the release gear member and is disengaged from the drive gear member when the seat back is in the design position. The motor rotates the release gear member through the defined angular range when the motor is actuated while the seat back is in the design position. Rotation of the release gear member to a first end of the defined angular range moves the lock mechanism to the unlocked state. Operation of the motor after the lock mechanism is unlocked causes the seat back to pivot forward through engagement between and the release gear member until the motor engages the drive gear member. Operation of the motor after the motor engages the drive gear member causes the seat back to pivot about the pivot axis through engagement between the motor and the drive gear.

In an implementation of the second embodiment, the release and drive mechanism further includes a pinion gear member disposed adjacent a periphery of the drive gear member and a periphery of the release gear member. The motor is connected to the pinion gear member and engages the release gear member and the drive gear member through the pinion gear member. In a variation of this implementation, the periphery of the drive gear member defines a relief portion and the pinion gear member is aligned with the relief portion when the seat back is in the design position. In a further variation of this implementation, the pinion gear member, the drive gear member and the release gear member each include a plurality of teeth. The pinion gear member engages the drive gear member and the relief gear member through engagement between the teeth of the pinion gear member with the teeth of the release gear member and the teeth of the drive gear member. In a further variation, the relief portion of the drive gear member is devoid of teeth. In a further variation of this implementation, the teeth of the release gear member extend along a length of the release gear member that exceeds a length of the relief portion of the drive member.

In another implementation of the second embodiment, the drive gear member includes a blocking member that extends substantially transversely to a plane of the drive gear member. The release gear member defines a cut-out. The blocking member is received within the cut-out. The defined angular range of rotation of the release gear member is defined by engagement between the blocking member and opposite ends of the cut-out. In a variation of this implementation, the mounting member is attached to the seat bottom and the motor is attached to the seat back.

In a third embodiment, the vehicle seat assembly includes a seat body having a seat bottom and a seat back that is configured to pivot with respect to the seat bottom about a pivot axis. A lock mechanism is connected to the seat body. The lock mechanism is configured to inhibit the seat back from pivoting about the pivot axis when locked and permits the seat back to pivot about the pivot axis when unlocked. A first switch is associated with the lock mechanism for sensing the condition of the lock mechanism. A second switch is associated with the seat back for sensing the position of the seat back. A release and drive mechanism for controlling pivotal movement of the seat back is connected to the seat body. The release and drive mechanism includes a mounting member that is attached to the seat body, a drive gear member that is rotatably connected to the mounting member and to the lock mechanism, and a motor that is connected to the seat body and to the drive gear member. The motor is configured to rotate the drive gear member. In this third embodiment, the mounting member and the drive gear member are configured to limit rotation of the drive gear member through a defined angular range. Operation of the motor rotates the drive gear member through the defined angular range. Rotation of the drive gear member to a first end of the defined angular range moves the lock mechanism to the unlocked state. Operation of the motor after the lock mechanism is unlocked causes the seat back to pivot about the pivot axis through engagement between the motor and the drive gear member.

In a first implementation of the third embodiment, the vehicle seat assembly further comprises a first lobe associated with the lock mechanism. The first lobe is configured to close the first switch when the lock mechanism is unlocked.

In another implementation of the third embodiment, the vehicle seat assembly further comprises a second lobe associated with the seat back. The second lobe is configured to close the second switch when the seat back in a generally upright position.

In another embodiment of the third embodiment, the vehicle seat assembly further comprises a first lobe associated with the lock mechanism and a second lobe associated with the seat back. The first lobe is configured to close the first switch when the lock mechanism is unlocked and the second lobe is configured to close the second switch when the seat back in a generally upright position.

DETAILED DESCRIPTION OF THE PREFERRED EMBODIMENT(S)

A non-limiting embodiment of a vehicle seat assembly equipped with various embodiments of a power release and drive mechanism is disclosed herein. The power release and drive mechanism may be configured to facilitate releasing a seat back or a seat bottom (not shown) that are pivotably mounted to one another so as to position the seat back and/or the seat bottom in a plurality of positions defined by the positioning of the seat back relative to the seat bottom. These positions may include a design position, a reclined position, a fold flat position, or any other position where the seat back is inclined or otherwise oriented with respect to the seat bottom or vice versa. As used throughout this disclosure, "design position" is defined as that position where the seat is in its normal use position, also known as an upright position, for purposes of establishing seat back angle, H-point, and other ergonomic considerations relative to occupant comfort and safety while seated in the seat. In the design position, the seat back is usually locked.

The power release and drive mechanism may be used with any type of seat including, but not limited to, vehicle seats. The power release and drive mechanism may combine manual and motor driven (or other non-manual movements) to facilitate adjusting the seat. Optionally, additional positioning may be facilitated or driven by the power release and drive mechanism, including manual or automatic tumble and stadium positioning. In at least one embodiment, the power release and drive mechanism is capable of both releasing a seat back to pivot and controlling the motion of the seat back as it folds.

Figure 1:
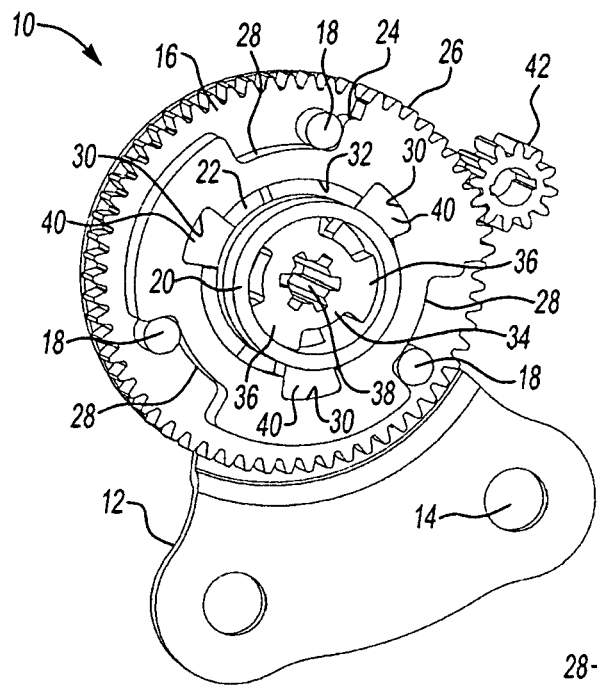
FIG. 1 is a perspective view of an embodiment of a power release and drive mechanism of the present invention.

With respect to FIG. 1, the power release and drive mechanism 10 is configured for attachment to a seat including a vehicle seat. In the illustrated embodiment, the power release and drive mechanism 10 includes a base plate 12. Base plate 12 includes a plurality of mounting openings 14 (see also FIGS. 3-6) which may be used to affix power release and drive mechanism 10 to a seat bottom. In other applications, base plate 12 may be used to attach power release and drive mechanism 10 to a seat back. It should be understood to those of ordinary skill in the art that while the present description of the power release and drive mechanism 10 is provided in the context of a vehicle seat, power release and drive mechanism 10 may be utilized with any folding seat.

Drive gear 16 is assembled to base plate 12 and is affixed thereto so as to be substantially immobile with respect to base plate 12. Drive gear 16 may be affixed to base plate 12 by any method effective to render drive gear 16 substantially immobile with respect to base plate 12 including, but not limited to, welding, riveting, or fastening using threaded fasteners. In some embodiments, drive gear 16 may be a spur gear or an intermittent spur gear as illustrated in FIGS. 1-12. Alternatively, drive gear 16 may have no teeth and engagement between the drive gear and other gears may be accomplished through friction between the components. In the illustrated embodiments, drive gear 16 is generally circular in shape and includes a relief portion 17 having no gear teeth (see FIG. 5). As used throughout this application, the term "relief portion" means a portion of drive gear 16 that is configured to avoid engagement with a pinion gear (discussed below). In some embodiments, the relief portion will be a gap in gear teeth. In other embodiments, the relief portion may constitute an area where the gear teeth have been modified to avoid engagement with the pinion gear. In embodiments where the drive gear has no teeth (such as embodiments using frictional engagement between components), the relief portion may constitute an area on the surface of a perimeter of the drive gear that is depressed radially inwardly.

One of ordinary skill in the art should understand that drive gear 16 need not be circular, but rather, may comprise any shape including a portion that includes an arc that is concentric with, and coextensive with, the anticipated range of motion of the folding seat back or the folding seat bottom. Stop pins 18 are attached to a surface of drive gear 16 and are affixed so as to be immobile therewith. In the illustrated embodiment, drive gear 16 is equipped with three stop pins 18. In other embodiments, a greater or lesser number of stop pins 18 may be utilized.

Base plate 12 includes base plate center hub 20 disposed generally at a center of base plate 12. Drive gear 16 is disposed so as to be centered around base plate center hub 20. Base plate center hub 20 includes three pawl openings 22. In other applications, a greater or lesser number of pawl openings may be employed.

Release gear 24 is pivotably attached to base plate center hub 20 and is configured to move between a design position and a release position. Release gear 24 includes a pinion engagement portion 26, a plurality of cut-outs 28, a plurality of pawl notches 30, and a hub engagement opening 32. Release gear 24 pivots about base plate center hub 20, engaging base plate center hub 20 about hub engagement opening 32. In some embodiments, pinion engagement portion 26 includes a plurality of teeth (see FIGS. 1-12). Release gear 24 is disposed adjacent drive gear 16 such that the teeth of drive gear 16 and the teeth of pinion engagement portion 26 are aligned with one another when the release gear is in the design position and also when the release gear is in the release position. When power release and drive mechanism 10 is disposed in its design position, release gear 24 is disposed adjacent drive gear 16 such that stop pins 18 are disposed within cut-outs 28, with each stop pin 18 being disposed adjacent a clockwise wall of cut-out 28. A spring (not shown) biases release gear 24 in a counter-clockwise direction, urging the clockwise walls of release gear 24 against stop pins 18. As used throughout this disclosure, the terms "clockwise" and "counter-clockwise" refer to the clockwise and counter-clockwise directions relative to the figure being described. It should be understood that embodiments which are symmetrically opposite to the embodiments illustrated may also be employed without departing from the teachings of the described invention. In cases where symmetrically opposite embodiments are employed, references to "clockwise" and "counter-clockwise" herein would be reversed. Additionally, when power release and drive mechanism 10 is in its design position, pawl notches 30 are aligned with their respective pawl openings 22.

Torque rod center hub 34 is pivotally mounted within an internal portion of base plate center hub 20. Torque rod center hub 34 includes three pawl engagement prongs 36 which protrude outwardly from a center portion of torque rod center hub 34. Torque rod center hub 34 further includes a torque rod engagement opening 38 disposed at approximately the center portion of point on torque rod center hub 34. Torque rod engagement opening 38 is configured to engage a torque rod assembled to the seat assembly (not shown). In at least one embodiment of a vehicle seat, the torque rod serves to release a mechanism locking the vehicle seat's seat back in an upright position. Once the torque rod releases that mechanism, the seat back is free to fold forward.

Power release and drive mechanism 10 further includes three pawls 40. In the illustrated embodiment, pawls 40 are separate components of power release and drive mechanism 10. In other embodiments, pawls 40 may be incorporated as part of release gear 24. In the illustrated embodiment, pawls 40 are configured to fit within pawl notches 30 of release gear 24. When positioned in this manner, pawls 40 protrude inwardly towards hub engagement opening 32. Pawls 40 protrude through pawl openings 22 in base plate center hub 20 such that they reside substantially adjacent to pawl engagement prongs 36.

Figure 5:
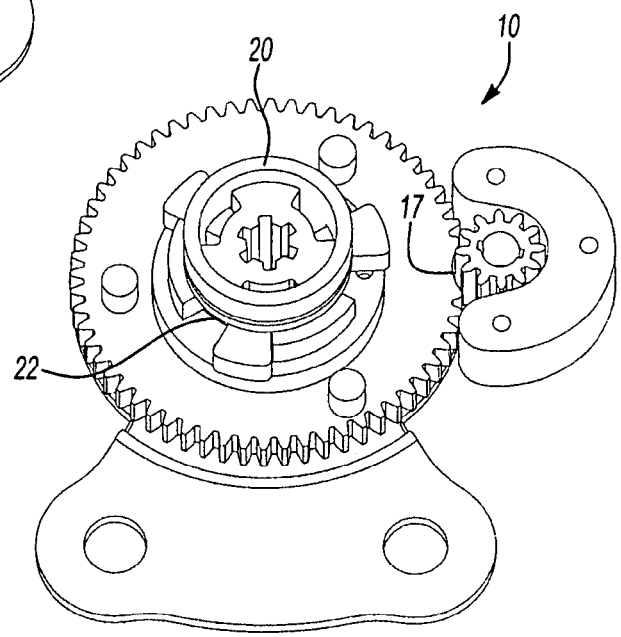
FIG. 5 is a perspective view illustrating the power release and drive mechanism of FIG. 4 with a release gear removed.

Motor pinion 42 is attached to a seat back portion of the vehicle seat and disposed adjacent the pinion engagement portion 26 of release gear 24 and the relief portion 17 of drive gear 16 (see FIG. 5). Motor pinion 42 is configured to engage pinion engagement portion 26 and drive gear 16. As motor pinion 42 engages these components, it causes the seat back to pivot about base plate center hub 34.

Figure 2:
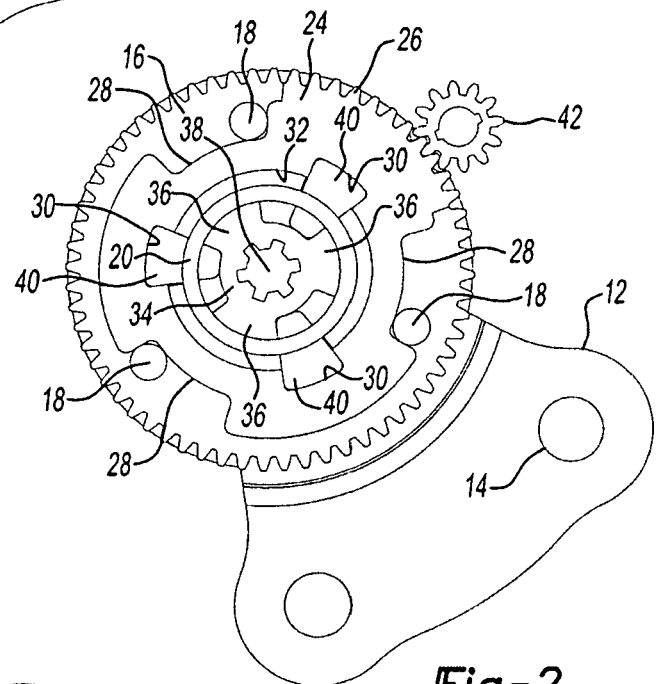
FIG. 2 is a front elevational view of the power release and drive mechanism illustrated in FIG. 1.

FIG. 2 illustrates how the various components of power release and drive mechanism 10 align with one another. For instance, pinion engagement portion 26 of release gear 24 aligns with a perimeter of drive gear 16. FIG. 2 further illustrates how pawls 40 protrude through pawl openings 22 of base plate center hub 20 to engage pawl engagement prongs 36.

Figure 3:
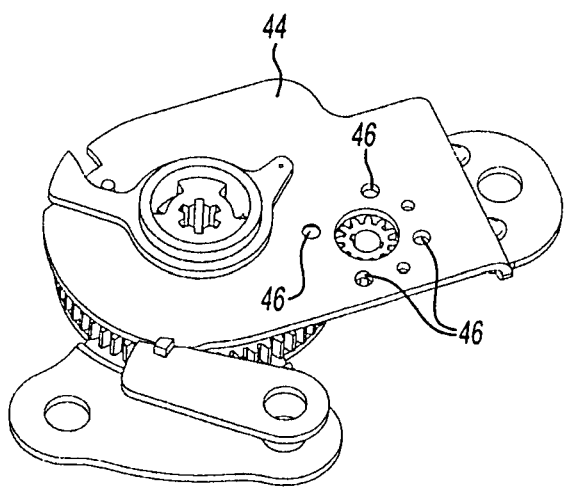
FIG. 3 is a perspective view illustrating a more detailed embodiment of the power release and drive mechanism of FIG. 1 showing the power release and drive mechanism in a configuration including a plate for mounting a motor.

FIG. 3 is a more detailed illustration of the power release and drive mechanism 10 of FIG. 1 showing a motor mounting plate 44. Motor mounting plate 44 includes openings 46 to allow motor pinion 42 to be attached to motor mounting plate 44. Motor mounting plate 44 is configured to rotate about base plate center hub 20.

Figure 4:
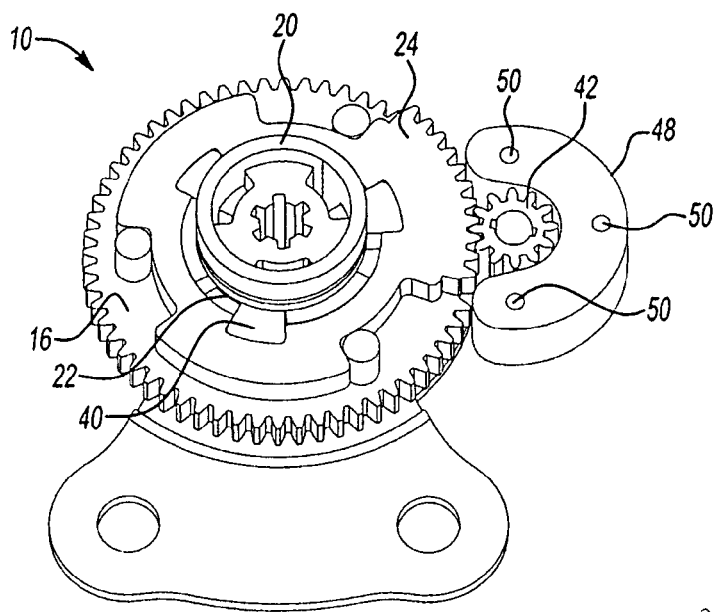
FIG. 4 is a perspective view illustrating the power release and drive mechanism of FIG. 3 with the plate removed.

With respect to FIG. 4, the motor mounting plate 44 has been removed and each of the components discussed above are illustrated in engagement with one another. Additionally, in this view, shroud 48 is illustrated. Shroud 48 includes shroud mounting openings 50 which are disposed to align with openings 46 on motor mounting plate 44. Fasteners (not shown) may extend therethrough to affix motor pinion 42 to motor mounting plate 44. Motor mounting plate 44 maintains the relative positioning of motor pinion 42 with respect to power release and drive mechanism 10 as the mechanism is actuated to facilitate engagement of the teeth of motor pinion 42 with the teeth of either or both drive gear 16 and release gear 24.

FIG. 5 illustrates the power release and drive mechanism 10 of FIG. 4 without release gear 24. This view illustrates the protrusion of pawls 40 through pawl openings 22. This view also illustrates relief portion 17 and its alignment with motor pinion 42 when power release and drive mechanism 10 is in its design position.

Figure 6:
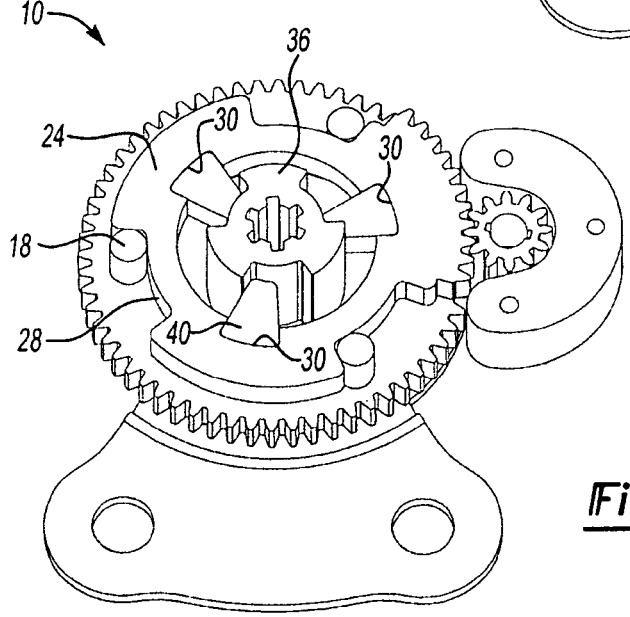
FIG. 6 illustrates the power release and drive mechanism of FIG. 4 with base plate center hub removed.

FIG. 6 illustrates the power release and drive mechanism 10 of FIG. 4 without base plate center hub 20. This view illustrates the close fitting engagement of pawls 40 within pawl notches 30 of release gear 24. This view also illustrates the engagement of pawls 40 with pawl engagement prongs 36.

FIGS. 7-12 illustrate operation of power release and drive mechanism 10. These figures include a portion of a vehicle seat back 52 to facilitate an illustration of operation of power release and drive mechanism 10.

Figure 7:
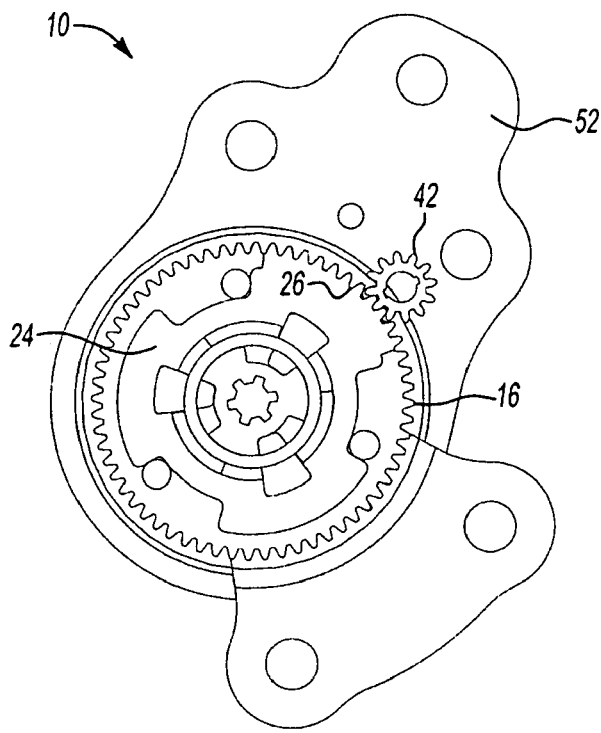
FIGS. 7-12 illustrate a portion of a vehicle seat and the power release and drive mechanism in various stages of operation of the power release and drive mechanism.

In FIG. 7, power release and drive mechanism 10 is illustrated in its design position. In this position, motor pinion 42 is disposed adjacent relief portion 17 of drive gear 16 and also adjacent pinion engagement portion 26 of release gear 24. When power release and drive mechanism 10 is actuated, such as when a user operates a switch (not shown) connected to power release and drive mechanism 10, motor pinion 42 begins to rotate. In the illustrated embodiment, motor pinion 42 rotates in a counter-clockwise direction (see FIG. 8). As motor pinion 42 rotates, its teeth engage the teeth of release gear 24, causing release gear 24 to rotate in a clockwise direction. Because motor pinion 42, when in the design position, is adjacent to relief portion 17 of drive gear 16, motor pinion 42 does not engage drive gear 16 and will not engage drive gear 16 until seat back 52 rotates to a position that is forward of its design position.

Figure 8:
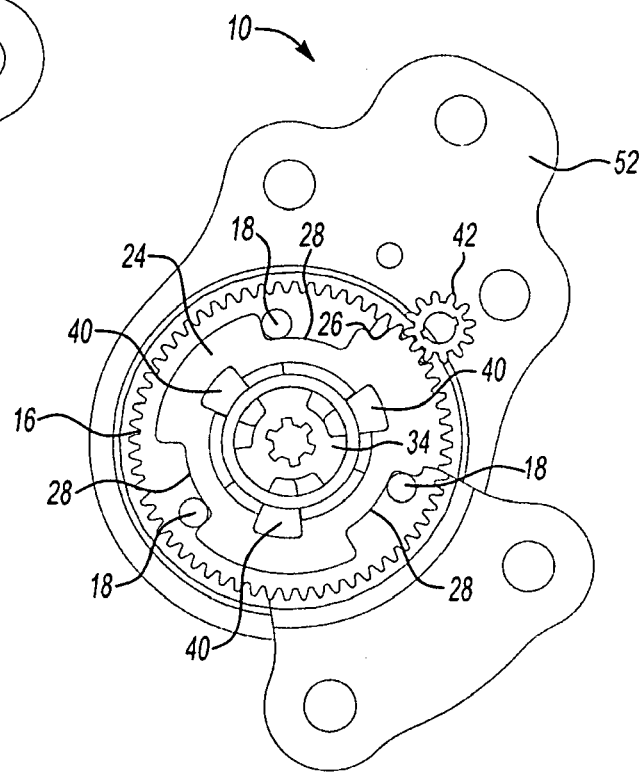

As illustrated in FIG. 8, motor pinion 42 has rotated release gear 24 approximately 30° in a clockwise direction. At this point, the counter-clockwise walls of cut-outs 28 engage stop pins 18 and inhibit release gear 24 from further rotation in a clockwise direction. The rotation of release gear 24 rotates torque rod center hub 34 approximately 30° in a clockwise direction through engagement with pawls 40. The rotation of torque rod center hub 34 causes the torque rod (not shown) of the vehicle seat (not shown) to rotate and release a locking mechanism thereby permitting seat back 52 to rotate forward or counter-clockwise.

As motor pinion 42 continues to rotate in the counter-clockwise direction, motor pinion 42 begins to walk along pinion engagement portion 26 of release gear 24, causing seat back 52 to rotate in the forward or counter-clockwise direction. As motor pinion 42 walks along pinion engagement portion 26 of release gear 24, it comes out of alignment with relief portion 17 of drive gear 16 and engages the teeth of drive gear 16. As motor pinion 42 continues to rotate in a counter-clockwise direction, it walks along both pinion engagement portion 26 and drive gear 16.

Figure 9:
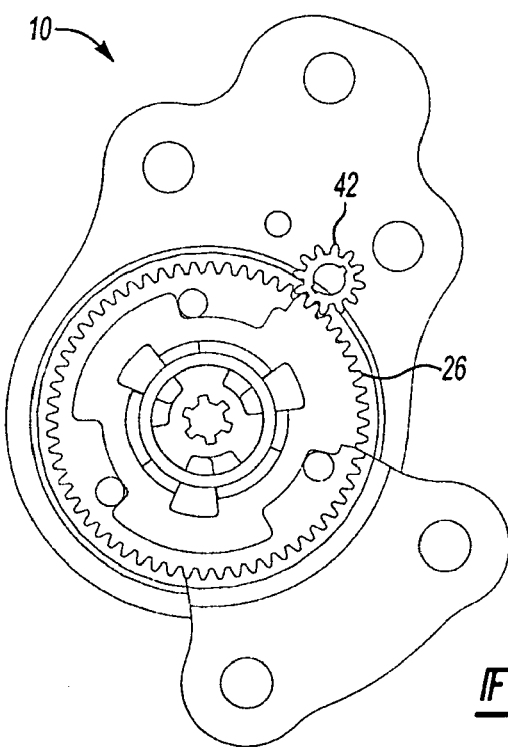

In FIG. 9, motor pinion 42 has reached the end of pinion engagement portion 26.

Figure 10:
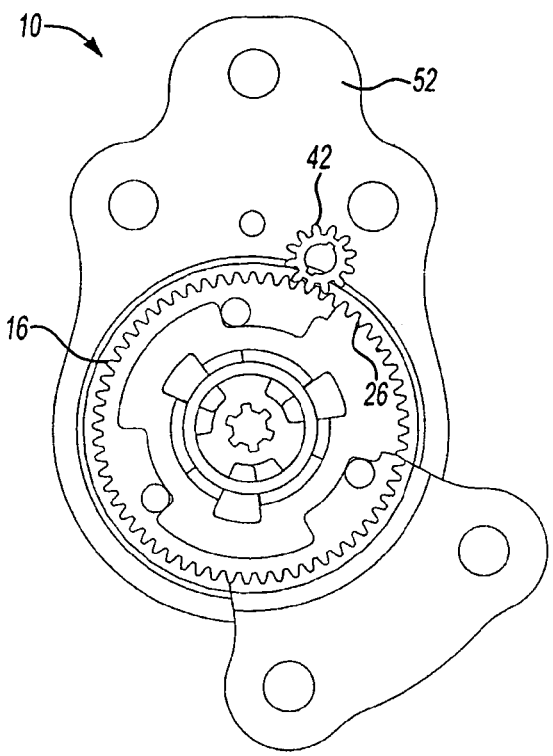

With respect to FIG. 10, after motor pinion 42 reaches the end of pinion engagement portion 26, it continues to walk along drive gear 16, causing seat back 52 to continue to rotate in a forward or counter-clockwise direction. At this stage of operation, motor pinion 42 is no longer engaged with pinion engagement portion 26 of release gear 24.

Figure 11:
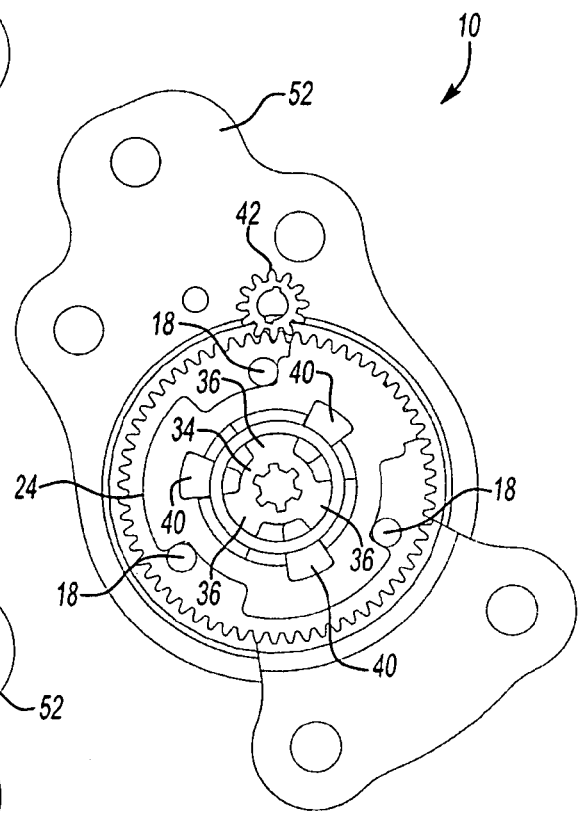

With respect to FIG. 11, as motor pinion 42 continues to rotate in a counter-clockwise direction it causes seat back 52 to continue folding forward. Release gear 24 also rotates in a counter-clockwise direction, in effect, following motor pinion 42 under the urging of the spring that biases release gear 24 against stop pins 18. As release gear 24 returns to its design position biased against stop pins 18, pawls 40 come out of engagement with pawl engagement prongs 36. As discussed above, torque rod center hub 34 is engaged with the seat's torque rod. Mechanisms in the vehicle seat prevent the torque rod from returning to its locked condition until the seat back is in its design position. Because the torque rod does not rotate back to the locked position, the torque rod center hub correspondingly does not rotate back to its design position.

Figure 12:
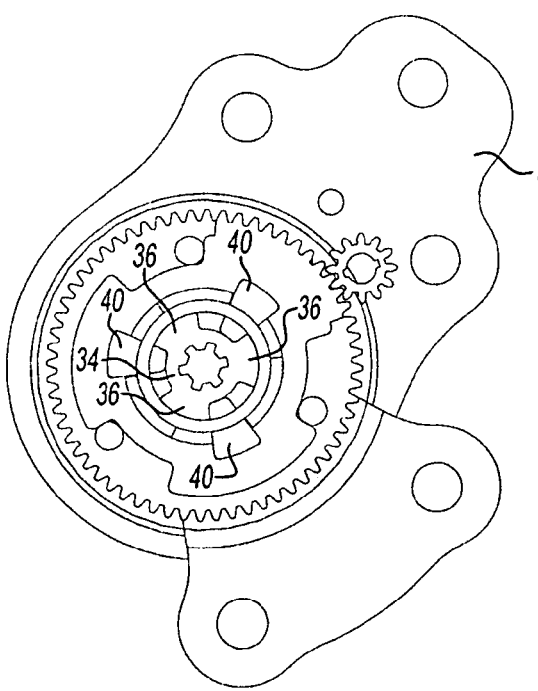

With respect to FIG. 12, seat back 52 has returned to it design position, and the seat back release mechanism has returned to its locked state thus rotating the torque rod (not shown) counter-clockwise and, consequently, rotating the torque rod center hub 34 in a counter-clockwise direction such that pawl engagement prongs 36 are, once again, engaged with pawls 40.

As motor pinion 42 drives backward along drive gear 16 in a clockwise direction, seat back 52 returns to its design position. When motor pinion 42 reaches release gear 24, it continues walking in a clockwise direction, now engaged with both the pinion engagement portion 26 as well as drive gear 16. At this stage, as motor pinion 42 rotates in a clockwise direction, release gear 24 is precluded from rotating backward in a counter-clockwise direction because the clockwise walls of cut-outs 28 are engaged with stop pins 18. As motor pinion 42 continues to walk back in a clockwise direction along both release gear 24 and drive gear 16, motor pinion 42 encounters relief portion 17 of drive gear 16. Motor pinion 42 is, nevertheless, able to continue its walk back in a clockwise direction by virtue of its engagement with pinion engagement portion 26.

In some embodiments, when seat back 52 reaches its design position, the seat back 52 is obstructed from further clockwise rotation. Motor pinion 42 may be capable of detecting the excessive load caused by its attempted continued clockwise rotation against the obstruction and may cut power and ceases to rotate. In other embodiments, electronic detectors may be positioned on seat back 52 or other portions of power release and drive mechanism 10 to detect the location of the various components with respect to one another and, based on those readings, may shut off motor pinion 42. In other embodiments, seat back 52 may be designed to rotate further back than its design position. Other embodiments of power release and drive mechanism 10 may be configured to control such further rearward rotation of seat back 52.

In other embodiments, engagement means other than teeth may be used to control the engagement between motor pinion 42, drive gear 16 and pinion engagement portion 26. For example, the relative rotation of these parts with respect to one another may be controlled through frictional engagement. Additionally, while motor pinion 42, release gear 24 and drive gear 16 have been illustrated as spur gears and as intermittent spur gears, it should be understood that bevel gears or worm gears can also be used.

Figure 13:
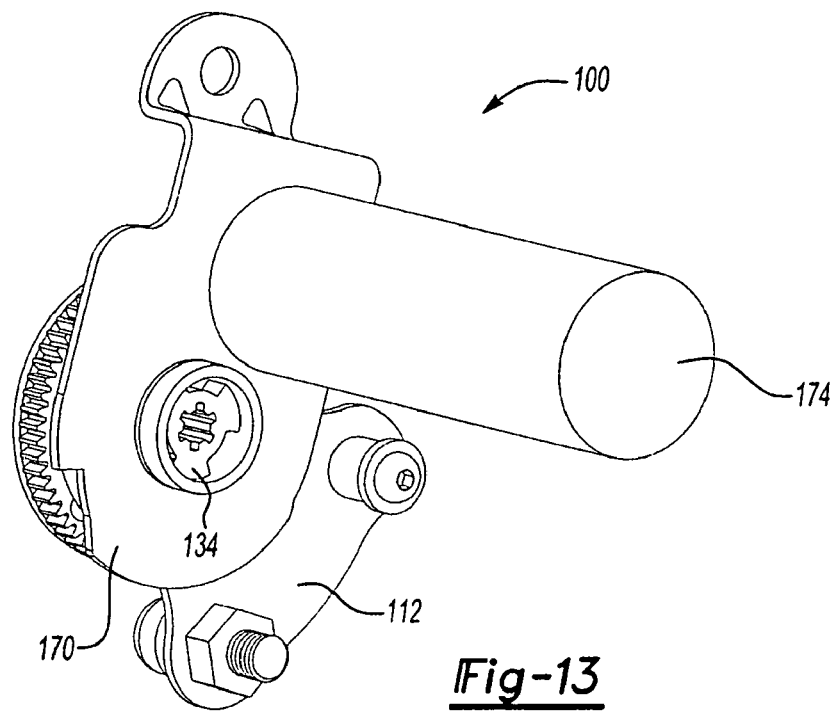
FIG. 13 is a perspective view of an alternate embodiment of a portion of a power release and drive mechanism.
Figure 15:
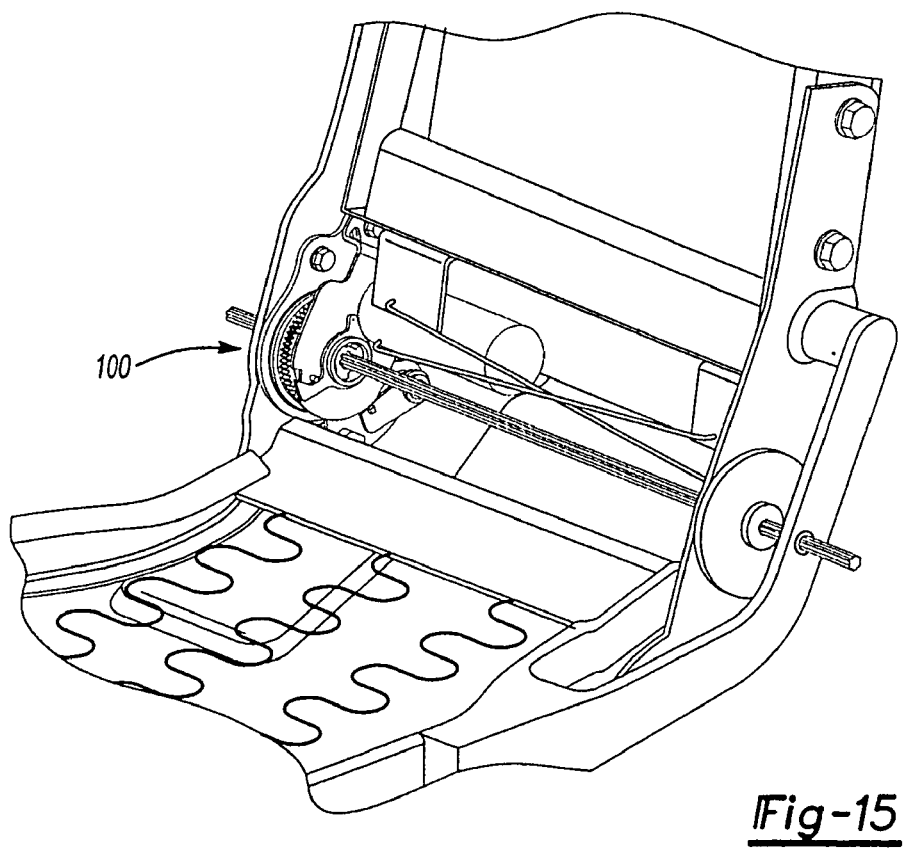
FIG. 15 is a perspective view of the mechanism of FIG. 13 mounted in a portion of a vehicle seat.
Figure 14:
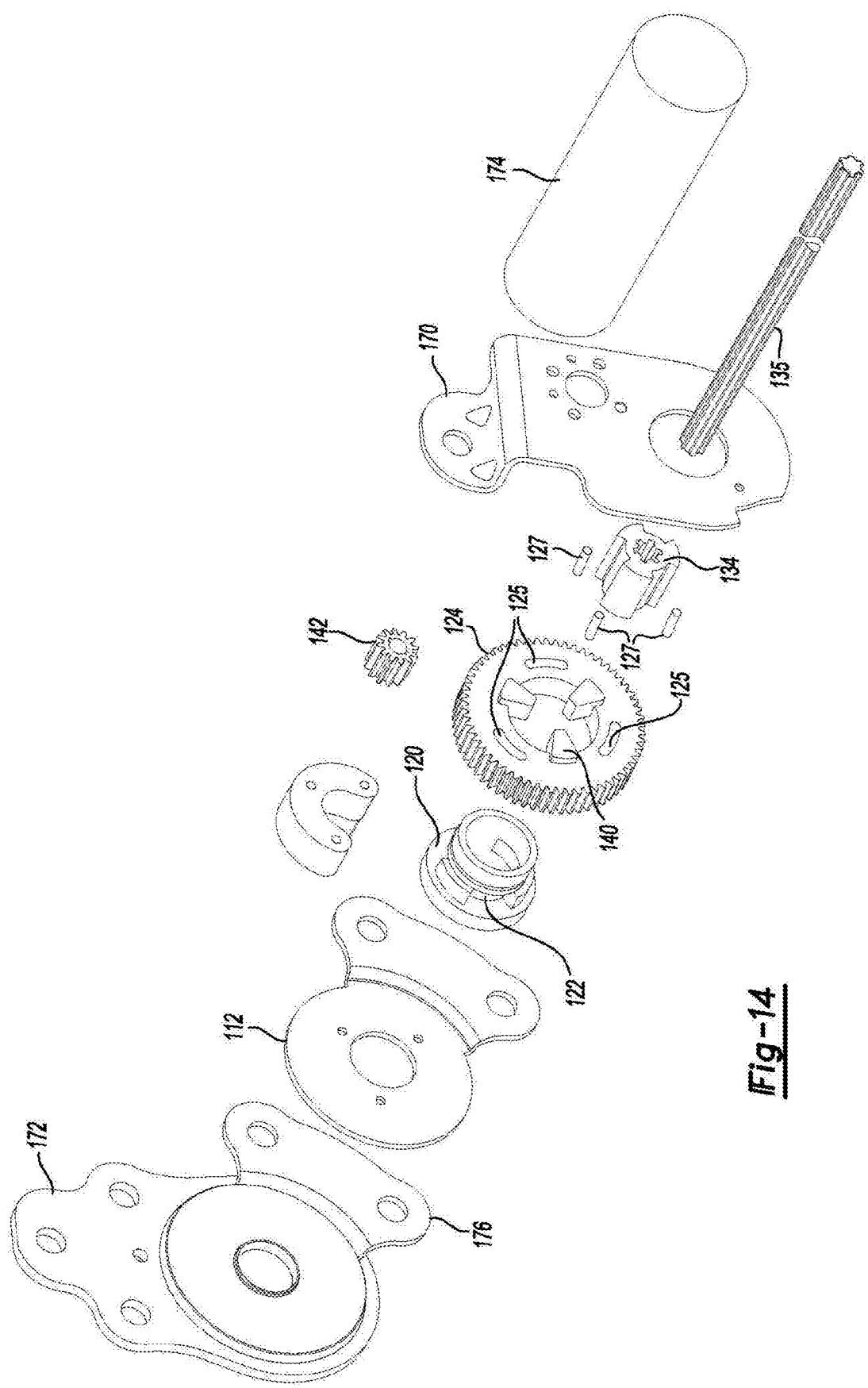
FIG. 14 is an exploded perspective view of the mechanism of FIG. 13.

Referring now to FIGS. 13-15, there is illustrated an alternate embodiment of a power release and drive mechanism, indicated generally at 100. The mechanism 100 is similar in function and structure as the power release and drive mechanisms shown and described with respect to FIGS. 1-12. One of the differences is that the mechanism 100 uses a single spur gear 124 instead of the combination of the drive gear 16 and the release gear 24. When the mechanism 100 is actuated, such as when a user operates a switch (not shown) connected to the mechanism 100, the motor pinion 142 begins to rotate in a counter-clockwise direction, for example, as viewing FIGS. 13 and 14. As the pinion 142 rotates, its teeth engages the teeth of the spur gear 124 causing the spur gear 124 to rotate in a clockwise direction. Similar to the mechanism 10 described above, this rotation causes simultaneous rotation of a torque rod engagement hub 134 which causes rotation of a torque rod 135 and releases a locking mechanism, thereby permitting the seat back to rotate forward or counter clockwise.

Radial inner ends of engagement pawls (or wedge dogs) 140 of the spur gear 124 are disposed in openings 122 of a hub 120. The configuration and dimensions of the openings 122 permit the spur gear 124 to rotate approximately 30 degrees (or any suitable degree of movement) without causing rotation of the hub 120. At the end of the 30 degree travel, the pawls 140 will engage with portions of the hub 134 and unlock the vehicle seat lock mechanism through engagement with torque rod 135. In some embodiments, such as the embodiment illustrated in FIG. 14, spur gear 124 includes a plurality of slots 125 extending through the release gear and an equal number of blocking members 127 fixed to spur gear mounting bracket 112. The rotation of spur gear 124 is limited to 30 degrees, or to any desirable angle, by engagement between the slots 125 and the respective blocking members 127. As the pinion 142 continues to rotate in a counter-clockwise direction, the pinion 142 begins to walk along the teeth of the spur gear 124, causing the seat back (via a motor mounting plate 170 and a recliner plate 172) to rotate in a forward or counter-clockwise direction in a similar manner as described above with respect to the mechanism 10.

The pinion 142 is attached to a motor 174 which is mounted on the motor mounting plate 170 which is connected and fixed relative to the recliner plate 172. The recliner plate is attached to a portion of the seat back. Thus, the motor 174 and the pinion 142 are connected to the seat back. The mechanism 100 further includes a spur gear mounting bracket 112 which is connected to a mounting bracket 176 which is operatively attached to a portion of the seat bottom of the vehicle seat.

In some embodiments, use of the above described single motor mechanism will release the recliner lock mechanism and then fold the seat back between the design position and a fold flat position in approximately 5 seconds. In one example of the above described release and drive mechanism, the recliner may be released to pivot and then the release and drive mechanism may provide approximately 9.6° of seat back recline capability in five increments of 1.92° each. In other embodiments, the recline range and the incremental range of recline may be greater or smaller to meet design needs.

The release and drive mechanism described herein may, when activated, keep the recliner lock mechanism in a released condition to permit adjustment of the seat back in various positions of recline. Embodiments of the mechanisms described above may be employed to control recliner lock actuation to permit a user to recline the seat back in various positions including positions forward of the design position even in embodiments that do not include a fold flat or other cargo position. The embodiments described herein may control multiple recliner lock mechanisms substantially simultaneously through the use of a torque rod that extends between said recliner lock mechanisms. In some embodiments, to assist the motor or to permit the use of a less powerful motor, springs or other biasing means may be employed to bias the seat back to return from a fold flat or other reclined position towards the design position. Seats equipped with the embodiments described above may be employed in any suitable position including second and third rows in a vehicle.

Figure 16:
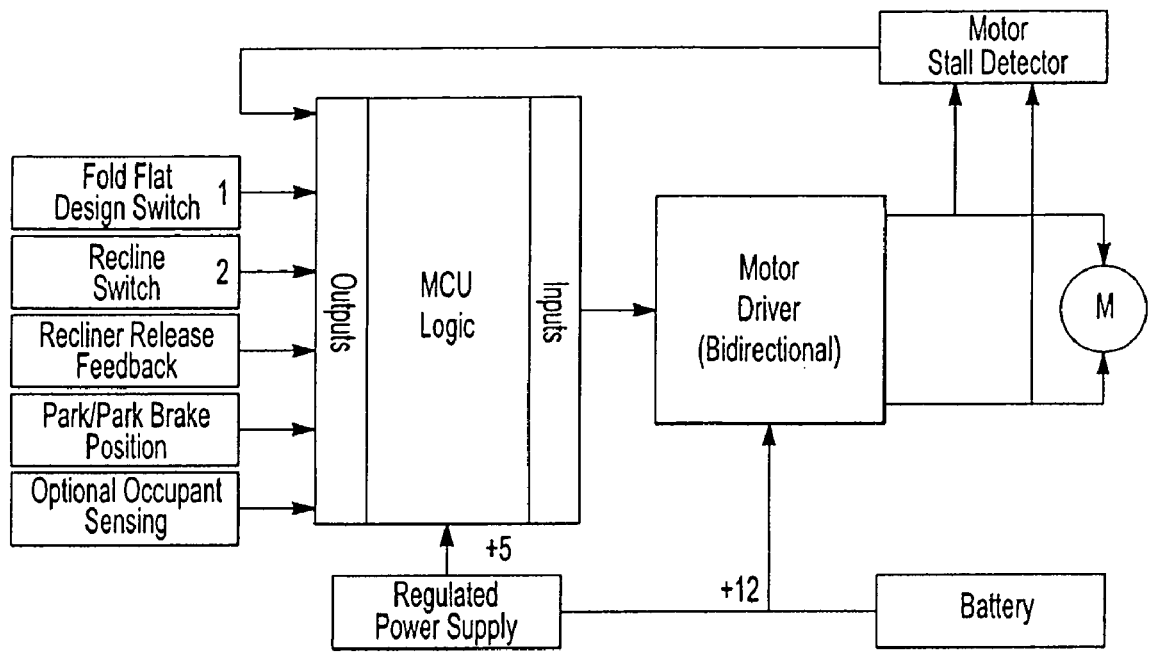
FIG. 16 is an electronics block diagram illustrating various component configurations for a vehicle seat equipped with a release drive mechanism made in accordance with the teachings of the present invention.
Figure 17A:
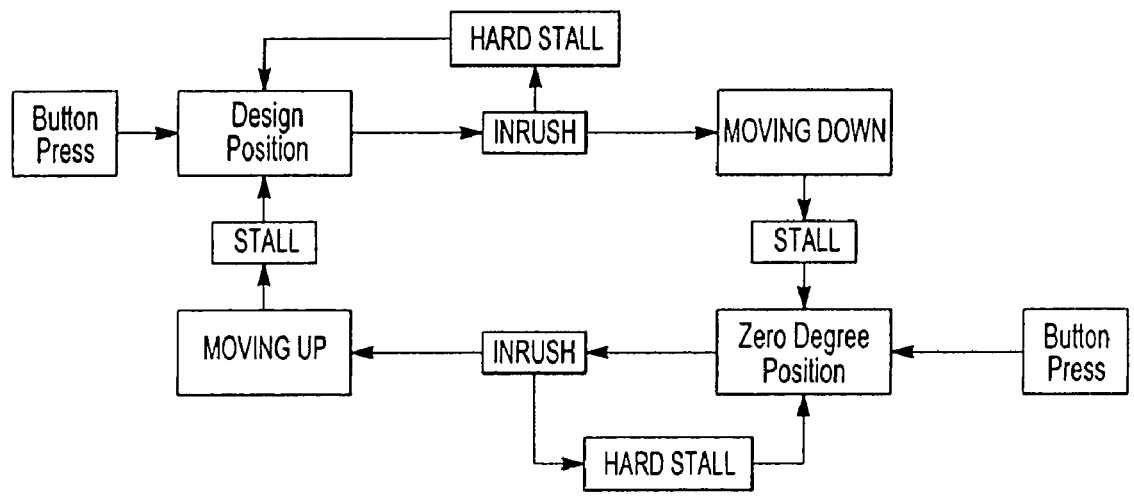
FIGS. 17A-B are block diagrams illustrating operation of a vehicle seat equipped with power release and drive mechanism of the present invention during fold flat and reclining operations, respectively.
Figure 17B:
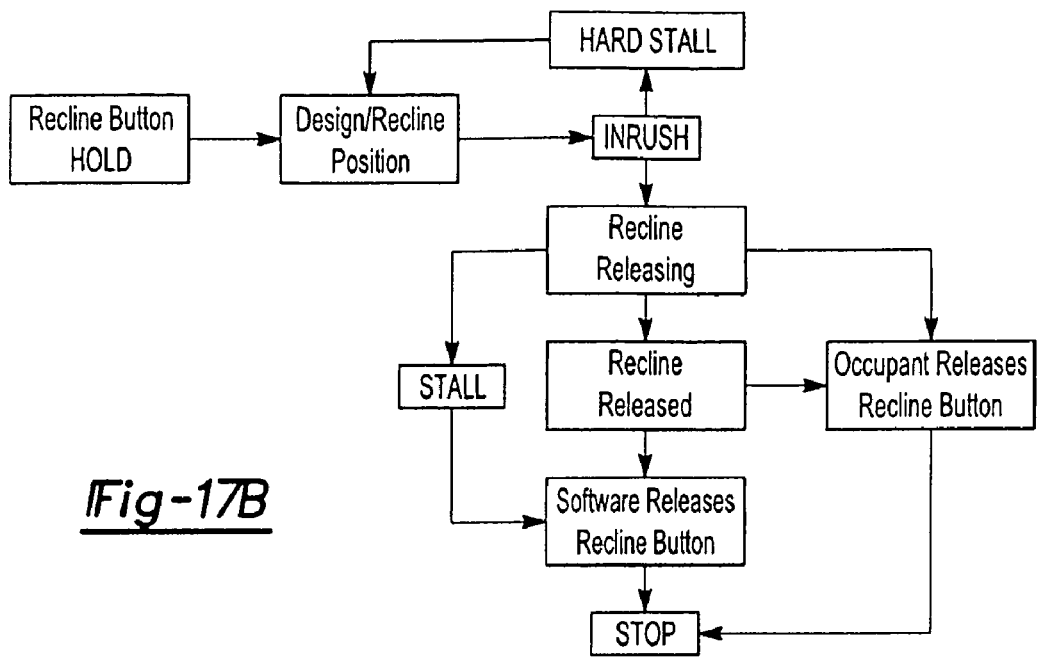
Figure 18:
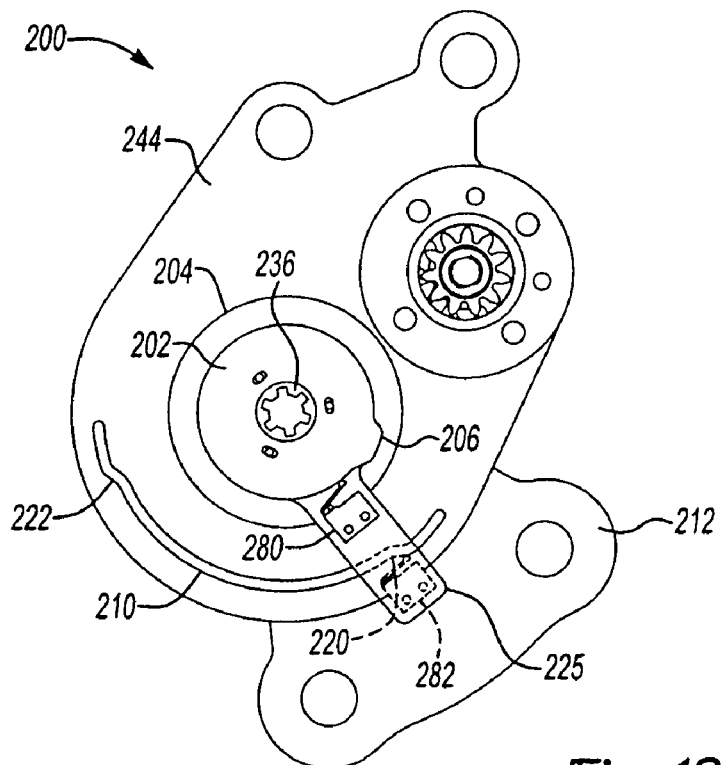
FIGS. 18-21 are schematic side elevational views of an alternate embodiment of a portion of a power release and drive mechanism having positional sensors mounted thereon.
Figures 19, 20, 21:
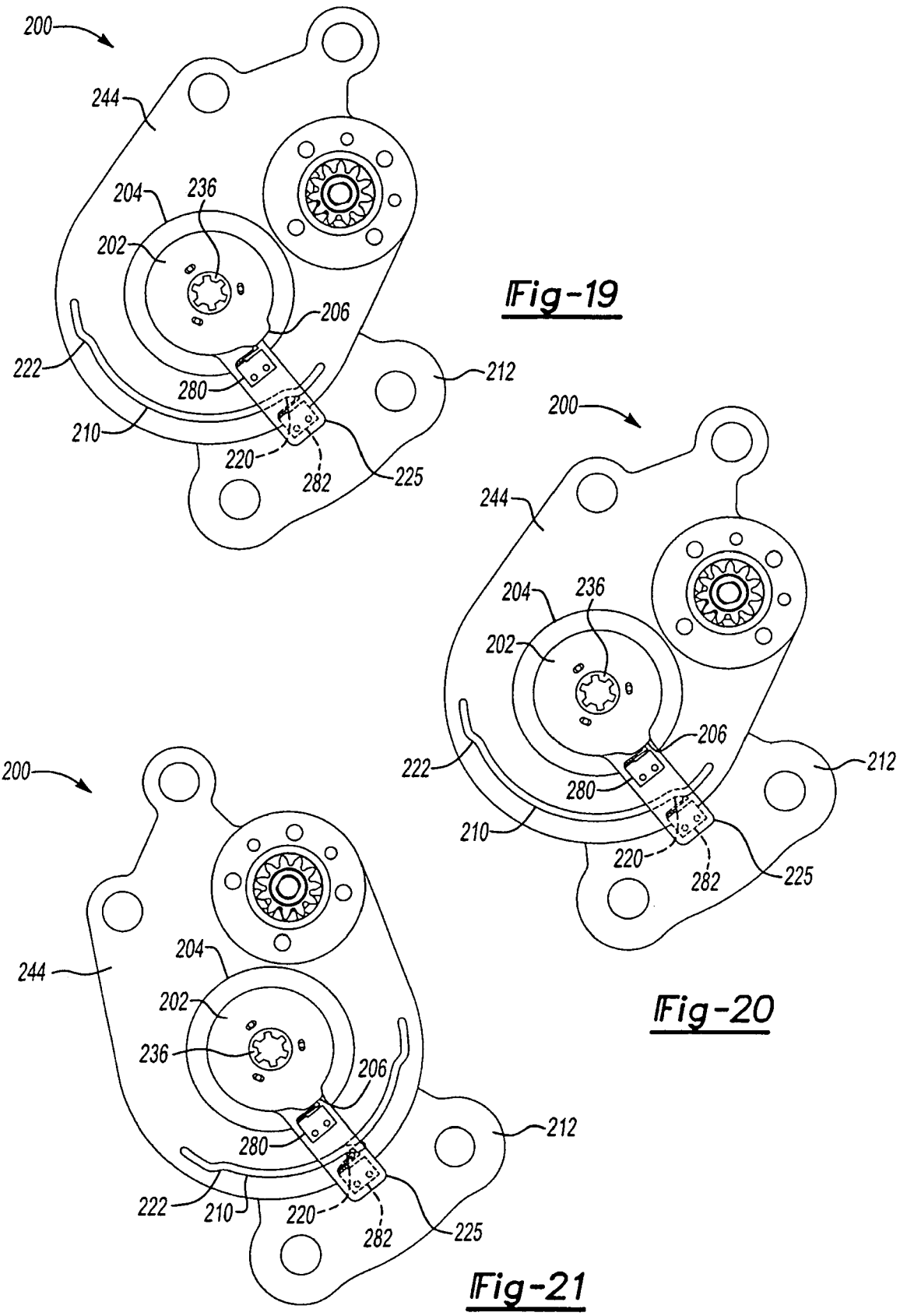

FIG. 16 illustrates an embodiment of an electronics block diagram for use with a seat equipped with embodiments of the release and drive mechanism discussed above. FIG. 17A is a block diagram illustrating fold flat operation of a vehicle seat equipped with embodiments of the release and drive mechanisms described above. FIG. 17B is a block diagram illustrating operation of a recline function for vehicle seats equipped with embodiments of the release and drive mechanisms discussed above.

The software used to program fold flat operation may include a stall current detection capability to detect when the seat back has reached its fold flat configuration and/or its design configuration. Such stall current detection capability may also be employed to detect the presence of an obstruction on the seat during folding operations. The stall current value is software configurable. Using a stall current value eliminates the need for continuous supervised button press operation. During seat operations, a button activation may be employed to stop seat operation. A second button activation may be employed to reverse the seat direction. With respect to the recline function, the vehicle seat may be equipped with the means for detecting or otherwise sensing the release or the unlocking of the recliner lock mechanism. The recline adjustment of the seat back may be controlled through the use of a continual recline button press. The recliner lock mechanism may re-lock when the recline button is released.

It may be desirable to monitor the angular position of the seat back relative to the seat bottom. It may also be desirable to monitor the operation of the locking mechanism connected to the torque rod 135. By monitoring these situations, feedback information is available for a microprocessor or controller to alter the actuation of other vehicle systems due to the physical position of the seat back or the position of the locking mechanism. For example, it may be desirable to know the angular position of the seat back relative to the seat bottom for control of a seat belt minder, an air bag or other passenger restrain system (e.g., if the seat back is moved to a folded position of top of the seat bottom such that no occupant is seated on the seat it may be desirable to prevent deployment of an air bag for that particular seating position). Other examples include alerting the driver or user of the seat by an audible warning or visual indicator that the locking mechanism is not at a proper position depending on the position of the seat or depending on other factors. It may be possible to determine possibly unsafe seating conditions such as when the locking mechanism may not have been properly latched when the seat back is in its upright position and/or when an occupant detection system determines a seated occupant. For another example, if the seat back is in an intermediate angular position between an upright seating position and a flat load floor position (wherein the seat back is above the seat bottom), an audible alarm may sound to alert the driver or user that the seat back is at an "illegal state" such that the seat back should not remain at that position for possible safety, structural integrity issues, and/or possible physical interferences with other moving components within the vehicle e.g., other seats or load floor panels).

It may also be desirable to monitor the position of the seat back for operation of the motor 174. For example, upon movement of the seat back towards a more vertical position, the power input to the motor may be increased due to the need to overcome gravitational forces in raising the seat back whereas during movement of the seat back towards a horizontal position, the motor may be actuated with less power consumption due to the assistance of gravity. It may also be desirable to monitor the position of the seat back and/or the locking mechanism in conjunction with monitoring the actuation of the motor to prevent "motor burn out," for example, if an object is placed on the seat and is interfering with lowering of the seat back even though a user is providing input by actuating a button for moving the seat back. It may also be desirable to monitor the position of the seat back and/or locking mechanism for diagnostic reasons to ensure proper operation of the seating components. Diagnostic warning messages or alerts may then be generated.

It is possible to monitor the position of the seat back and locking mechanism by using external sensors mounted on the seat back, portions of the vehicle, or the locking mechanism. However, the structure and operation of the power release and drive mechanisms 10 and 100 described and shown herein provide a suitable arrangement wherein switches or sensors may be connected to the mechanism 10 and 100 such that the position of certain components of the mechanisms 10 and 100 corresponds to positions of the seat back and locking mechanism. Thus, by knowing the position of certain components of the mechanism, the corresponding positions of the seat back and the locking mechanism may be determined. FIGS. 18-21 schematically illustrate one possible embodiment of such a sensor arrangement.

Referring to FIGS. 18-21, there is illustrated a portion of a power release and drive mechanism 200 which is similar and function and structure as the mechanisms 10 and 100 and, therefore, similar terminology with two hundred series numbers will be used to designate similar components. The mechanism 200 includes a cam 202 which is in the form of a relatively flat generally circular disk having an outer perimeter edge 204 having a radius generally corresponding from the pivot axis of the mechanism (and seat back). The cam 202 is preferably rotationally fixed relative to a torque rod hub 236 which is connected to a torque rod and a locking mechanism. The cam 202 may be a separate component or an integral portion of a torque rod engagement hub. The cam 202 may have one or more lobes 206 extending radially outwardly or inwardly from the outer perimeter edge 204. The mechanism 200 further includes a motor mounting plate 244 defining a generally circular outer perimeter edge 210 having a radius generally corresponding from the pivot axis of the seat back. The plate 244 may include one or more lobes extending radially outwardly or inwardly from the outer perimeter edge 210. In the embodiment shown, the plate 244 includes a pair of lobes 220 and 222. The lobes 206, 220, and 22 may have any suitable profile and/or circumferential length.

The mechanism 200 includes a sensor bracket 225 which is preferably fixed relative to a spur gear mounting bracket 212 which is generally fixed relative to the seat bottom or floor of the vehicle. The mechanism 200 includes one or more switches or sensors mounted thereon to sense the position of the cam 202 and the plate 244. In the embodiment shown, a sensor, schematically illustrated at 280, is mounted on the sensor bracket 225. The sensor 280 is engaged with or otherwise communicates with the edge 204 and/or lobe 206 to determine the position and/or movement of the cam 202 relative to a "fixed" position, such as the seat bottom. The lobe 206 can have any suitable shape and be positioned at any location on the edge 204 to trigger the sensor 280 at a position that corresponds to any desired position of the locking mechanism. For example, the lobe 206 may be positioned such that the sensor 280 can detect when the locking mechanism has been moved to its unlatched position. In the embodiment shown, a sensor, schematically illustrated at 282, is mounted on the sensor bracket 225. The sensor 282 is engaged with or otherwise communicates with the edge 210 and/or lobes 220 or 222 to determine the position and/or movement of the plate 244 relative to a "fixed" position, such as the seat bottom. The lobes can have any suitable shape and be positioned at any location on the edge 210 to trigger the sensors at a position that corresponds to any desired position of the locking mechanism. For example, the lobe 220 may be positioned such that the sensor 282 can detect the upright seating position of the seat back, and wherein the lobe 222 is positioned such that the sensor 222 can detect the furthermost horizontal or flat load floor position of the seat back. It should be understood that any number of lobes or features may be formed to detect any corresponding position of the seat back and locking mechanism.

It should also be understood that the sensors can be any suitable switch or sensor component for detecting the position of the cam 202 and the plate 244. Examples include manual switches, hall effect sensors, and optical sensors. Thus, if the sensors where hall effect sensors, the cam 202 and plate 244 could incorporate magnetic or ferrous components instead of lobes for triggering the hall effect sensor corresponding to a desired position. Furthermore, a control system may be incorporated for not only determining the position of the seat back and the locking mechanism but also the velocity and/acceleration thereof.

The mechanism 200 may be configured such that the sensors or other components thereof can be calibrated after installation and mounting.

In accordance with the provisions of the patent statues, the principle and mode of operation of this invention have been explained and illustrated in its preferred embodiment. However, it must be understood that this invention may be practiced otherwise than as specifically explained and illustrated without departing from its spirit and scope.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly comprising: a seat body having a seat bottom and a seat back configured to pivot with respect to the seat bottom about a pivot axis;

a lock mechanism connected to the seat body, the lock mechanism being configured to inhibit the seat back from pivoting when in a locked state and to permit the seat back to pivot when in an unlocked state; and a release and drive mechanism connected to the seat body for controlling pivotal movement of the seat back, the release and drive mechanism including: a mounting member attached to the seat body;

a hub disposed on the mounting member, the hub having an opening that has a first end and a second end disposed opposite the first end;

a drive gear member having a mounting opening, wherein the mounting opening receives the hub;

a pawl fixedly disposed on the hub and extending radially toward the pivot axis; and a motor configured to rotate the drive gear member;

wherein the pawl engages the first end and is spaced apart from the second end when the lock mechanism is in the locked state.

2. The vehicle seat assembly of claim 1 wherein the release and drive mechanism further includes a pinion gear member connected to the motor and disposed to engage the drive gear member, the pinion gear member transmitting torque from the motor to the drive gear member.

3. The vehicle seat assembly of claim 2 wherein the drive gear member and the pinion gear member each have teeth disposed along a respective periphery and wherein the teeth of the pinion gear member engage the teeth of the drive gear member.

4. The vehicle seat assembly of claim 2 wherein the release and drive mechanism further includes a motor shaft support member disposed at least partially about the pinion gear member.

5. The vehicle seat assembly of claim 1 wherein the mounting member is attached to the seat bottom and wherein the motor is attached to the seat back.

6. The vehicle seat assembly of claim 1 wherein the release and drive mechanism further includes a pinion gear member attached to the seat back and connected to the motor, the pinion gear member disposed to engage the drive gear member and to transmit torque from the motor to the drive gear member when the motor is actuated.

7. The vehicle seat assembly of claim 1 wherein the mounting member includes a stopping member, wherein the drive gear member is configured to engage the stopping member, and wherein the drive gear member engages the stopping member at one end of a defined angular range.

8. The vehicle seat assembly of claim 7 wherein the drive gear member includes a slot defined in a surface of the drive gear member, the stopping member being disposed within the slot and moving along the slot as the drive gear member rotates through the defined angular range.

9. The vehicle seat assembly of claim 8 wherein the mounting member includes a plurality of the stopping members, wherein the drive gear member includes a plurality of the slots, each stopping member being disposed within a respective one of the slots and moving along the respective one of the slots as the drive gear member rotates through the defined angular range.

10. The vehicle seat assembly of claim 1 wherein the release and drive mechanism further includes a first hub member extending through a mounting opening in the drive gear member.

11. The vehicle seat assembly of claim 10 wherein the first hub member is disposed substantially coaxially with the drive gear member.

12. The vehicle seat assembly of claim 10 wherein the first hub member is generally cylindrical.

13. The vehicle seat assembly of claim 10 wherein the release and drive mechanism includes a plurality of blocking members extending from the mounting member that cooperate to limit rotation of the first hub member.

14. The vehicle seat assembly of claim 1 wherein the release and drive mechanism further includes a second hub member attached to the mounting member, the drive gear member being mounted on the second hub member.

15. The vehicle seat assembly of claim 14 wherein the second hub member extends through a mounting opening in the drive gear member.

16. The vehicle seat assembly of claim 8 wherein a first end of the defined angular range is defined by interference between the stopping member and an end of the slot.

17. A seat assembly comprising:
a seat body having a seat bottom and a seat back configured to pivot with respect to the seat bottom about a pivot axis between a design position and a folded position;
a lock mechanism connected to the seat body, the lock mechanism being configured to inhibit the seat back from pivoting about the pivot axis when locked and to permit the seat back to pivot about the pivot axis when unlocked; and
a release and drive mechanism for controlling pivotal movement of the seat back, the release and drive mechanism including:
a mounting member disposed proximate the seat body;
a drive gear member substantially immovably mounted to the mounting member wherein a periphery of the drive gear member defines a relief portion;
a release gear member disposed adjacent the drive gear member and rotatable therewith, the release gear member being connected to the lock mechanism; and
a motor having a pinion gear member configured to engage the drive gear member and the release gear member, wherein the pinion gear member engages the release gear member and is aligned with the relief portion such that the pinion gear member is disengaged from the drive gear member when the seat back is in the design position.

18. The seat assembly of claim 17 wherein the release and drive mechanism is configured to limit rotation of the release gear member through a defined angular range.

19. The seat assembly of claim 18 wherein the motor rotates the release gear member through the defined angular range when the motor is actuated while the seat back is in the design position.

20. The seat assembly of claim 17 wherein the pinion gear member, the drive gear member and the release gear member each include a plurality of teeth and wherein the pinion gear member engages the drive gear member and the release gear member through engagement between the teeth of the pinion gear member with the teeth of the release gear member and the teeth of the drive gear member.

21. The seat assembly of claim 17 wherein the relief portion of the drive gear member is devoid of teeth.

22. The seat assembly of claim 20 wherein the teeth of the release gear member extend along a length of the release gear member that exceeds a length of the relief portion of the drive gear member.

23. The seat assembly of claim 17 wherein the drive gear member includes a blocking member extending substantially transversely to a plane of the drive gear member, wherein the release gear member defines a cut-out, wherein the blocking member is received within the cutout.

24. The seat assembly of claim 17 wherein the mounting member is attached to the seat bottom and wherein the motor is attached to the seat back.

25. A seat assembly comprising:
a seat body having a seat bottom and a seat back configured to pivot with respect to the seat bottom;
a lock mechanism connected to the seat body, the lock mechanism being configured to inhibit the seat back from pivoting when locked and to permit the seat back to pivot when unlocked;
a first switch associated with the lock mechanism for sensing a condition of the lock mechanism;
a second switch associated with the seat back for sensing a position of the seat back; and
a release and drive mechanism for controlling pivotal movement of the seat back, the release and drive mechanism including:
a mounting member attached to the seat body;
a drive gear member rotatably connected to the mounting member and to the lock mechanism; and
a motor configured to rotate the drive gear member;
wherein a first lobe is associated with the lock mechanism and is configured to close the first switch when the lock mechanism is unlocked.

26. The seat assembly of claim 25 wherein the first lobe is disposed on a motor mounting plate.

27. The seat assembly of claim 25 further comprising a second lobe associated with the seat back and wherein the second lobe is configured to close the second switch when the seat back is in a generally upright position.

28. The seat assembly of claim 25 further comprising a second lobe associated with the seat back, wherein the first lobe is configured to close the first switch when the lock mechanism is unlocked and wherein the second lobe is configured to close the second switch when the seat back is in a generally upright position.

* * * * *